(12) United States Patent
Ke et al.

(10) Patent No.: US 11,773,820 B2
(45) Date of Patent: Oct. 3, 2023

(54) ACTIVE FOLDING WIND TURBINE CAPABLE OF RESISTING SEVERE TYPHOONS

(71) Applicant: Nanjing University of Aeronautics and Astronautics, Nanjing (CN)

(72) Inventors: Shitang Ke, Nanjing (CN); Jie Yang, Nanjing (CN); Shuo Wang, Nanjing (CN); Hao Wang, Nanjing (CN); Hongxin Wu, Nanjing (CN); Lin Du, Nanjing (CN); Guangquan Han, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 318 days.

(21) Appl. No.: 17/274,193

(22) PCT Filed: Jul. 9, 2020

(86) PCT No.: PCT/CN2020/101010
§ 371 (c)(1),
(2) Date: Mar. 8, 2021

(87) PCT Pub. No.: WO2021/093350
PCT Pub. Date: May 20, 2021

(65) Prior Publication Data
US 2022/0307464 A1  Sep. 29, 2022

(30) Foreign Application Priority Data

Nov. 14, 2019 (CN) .......................... 201911110003.X (51) Int. Cl.
*F03D 1/06* (2006.01)
*F03D 15/00* (2016.01)
*F03D 80/00* (2016.01)

(52) U.S. Cl.
CPC .......... *F03D 1/0675* (2013.01); *F03D 15/00* (2016.05); *F03D 80/00* (2016.05);
(Continued)

(58) Field of Classification Search
CPC ............ F05B 2240/302; F05B 2240/31; F05B 2240/313; F03D 7/0236; F03D 1/0675;
(Continued)

(56) References Cited

U.S. PATENT DOCUMENTS 2,815,820 A * 12/1957 Papadakos .............. B64C 27/50
416/143
7,821,148 B2 * 10/2010 Piasecki .................. F03D 7/042
290/55
8,672,631 B2 * 3/2014 Shi ........................ F03D 1/0633
416/233

FOREIGN PATENT DOCUMENTS

CN  203702465 U  7/2014
CN  104110349 A  * 10/2014
(Continued)

OTHER PUBLICATIONS

Machine Translation of KR20160036188A. Retrieved from: Espacenet. (Year: 2016).*
(Continued)

*Primary Examiner* — Igor Kershteyn
*Assistant Examiner* — Wesley Le Fisher
(74) *Attorney, Agent, or Firm* — Bayramoglu Law Offices LLC (57) ABSTRACT

An active folding wind turbine capable of resisting severe typhoons is provided. Each wind turbine blade includes an upper blade part and a lower blade part that are hinged to each other by a hinge device. A motor transmission system is installed in the lower blade part, is connected to the hinge device in a transmission manner, and can drive the upper
(Continued)

blade part to rotate relative to the lower blade part through the hinge device, so that the wind turbine blade is bent. When the upper blade part rotates to an end of a travel, a blade tip of the upper blade part is propped against an upper end of the lower blade part of an adjacent wind turbine blade. A winch is built in an upper portion of the lower blade part of the wind turbine blade, and is provided with a cable.

10 Claims, 6 Drawing Sheets

(52) U.S. Cl.
CPC ..... *F05B 2240/30* (2013.01); *F05B 2240/302* (2013.01); *F05B 2240/31* (2013.01)

(58) Field of Classification Search
CPC ..... F03D 1/0683; B64C 27/50; B64C 27/022; B64C 11/28; Y02E 10/72
USPC .................................................. 416/142, 143
See application file for complete search history.

(56) References Cited

FOREIGN PATENT DOCUMENTS

| | | | | |
|---|---|---|---|---|
| CN | 104454358 | A | | 3/2015 |
| CN | 108035842 | A * | | 5/2018 |
| CN | 110671262 | A | | 1/2020 |
| JP | 2003278642 | A | | 10/2003 |
| KR | 101053451 | B1 | | 8/2011 |
| KR | 20160036188 | A * | | 4/2016 |
| WO | WO-2009084992 | A1 * | 7/2009 | ............. F03D 3/062 |
| WO | WO-2010046287 | A2 * | 4/2010 | ............. F03D 1/001 |

OTHER PUBLICATIONS

Machine Translation of CN104110349A. Retrieved from: Espacenet. (Year: 2014).*
Machine Translation of CN108035842A. Retrieved from: Espacenet. (Year: 2018).*
Machine Translation of WO2010046287A2. Retrieved from: Espacenet. (Year: 2010).*

* cited by examiner

ACTIVE FOLDING WIND TURBINE CAPABLE OF RESISTING SEVERE TYPHOONS

CROSS REFERENCE TO THE RELATED APPLICATIONS

This application is the national phase entry of International Application No. PCT/CN2020/101010, filed on Jul. 9, 2020, which is based upon and claims priority to Chinese Patent Application No. 201911110003.X, filed on Nov. 14, 2019, the entire contents of which are incorporated herein by reference.

TECHNICAL FIELD

The present invention belongs to the field of horizontal axis wind generators, especially relates to a horizontal axis wind turbine that improves the safety of the blades under severe typhoon conditions, and in particular, relates to an active folding wind turbine capable of resisting severe typhoons.

BACKGROUND

Due to the energy crisis and environmental pollution problem, wind energy resources that is huge clean and renewable have attracted widespread attention. Wind power generation is readily available for exploiting and utilizing wind energy resources, especially the wind turbines for power generation. Wind turbines are mainly classified as horizontal axis wind generators and vertical axis wind generators according to shaft orientation of the wind turbine. Compared with the vertical axis wind generator, the horizontal axis wind generator is economical, has high wind energy conversion efficiency, and is easy to perform startup, shutdown and blade pitch control. As a result, when choosing the type of wind generator, the horizontal axis wind generator is preferred worldwide.

Existing horizontal axis wind turbines are generally expensive, and have potential safety hazards when subjected to severe typhoon. Blades of horizontal axis wind turbines are damaged or fractured by severe typhoons every year causing serious loss to wind farms. As a result, improving the stability of wind turbine blades under severe typhoon conditions and developing a durable, serviceable and safe horizontal axis wind turbine that is low in cost of power generation units has become a major issue of concern for those skilled in the art.

SUMMARY

With respect to existing engineering problems, the present invention provides a folding blade that has a novel structure and greatly improves the safety of a wind turbine under severe typhoon conditions, and further provides an active folding wind turbine capable of resisting severe typhoons.

In order to realize the above technical objective, the technical solutions adopted in the present invention are as follows.

An active folding wind turbine capable of resisting severe typhoons is provided with a wind turbine blade hub on an upper end thereof. A wind turbine shaft is installed in the wind turbine blade hub. One end, extending out of the wind turbine blade hub, of the wind turbine shaft is provided with a plurality of identical wind turbine blades at equal radians. Each wind turbine blade includes an upper blade part and a lower blade part that are hinged to each other by a hinge device. A lower portion of the lower blade part is fixedly connected to the wind turbine shaft. A motor transmission system is installed in the lower blade part. The motor transmission system is connected to the hinge device in a transmission manner. The motor transmission system drives the upper blade part to rotate relative to the lower blade part through the hinge device to bend the wind turbine blade. When the upper blade part rotates to an end of a travel, a blade tip of the upper blade part is propped against an upper end of the lower blade part of one adjacent wind turbine blade. A winch is built in an upper portion of the lower blade part of the wind turbine blade, and is provided with a cable. One end of the cable is wound on the winch, and the other end thereof is fixedly connected to the upper blade part propped against the lower blade part of the adjacent wind turbine blade. The winch tightens the cable to strengthen the abutment stability between the lower blade part where the winch is located and the adjacent upper blade part.

In order to optimize the above technical solutions, the adopted specific measures are as follows.

The hinge device includes a lower hinge, an upper hinge, a hinge base, and a hinge shaft. The hinge base is fixedly connected to the upper end of the lower blade part. The lower hinge is fixed on the hinge base. The upper hinge is fixed on the lower end of the upper blade part. The lower hinge and the upper hinge are hinged and fit with each other through the hinge shaft.

The motor transmission system includes a motor and a motor transmission gear. A motor shaft of the motor is connected to the motor transmission gear in a transmission manner, and the motor transmission gear is engaged and fits with the hinge shaft. When the motor runs, the motor shaft of the motor drives the motor transmission gear to rotate, and the motor transmission gear drives the hinge shaft to rotate.

The motor is a servo motor that has a holding-brake and self-locking function and can rotate bidirectionally.

The number of the wind turbine blades is three, and a distance between the hinge shaft of the wind turbine blade and a center of the wind turbine shaft is $$\frac{L}{1+\sqrt{3}},$$

wherein L is a length of the wind turbine blade, and a rotation angle of the upper blade part is 120°.

The number of the wind turbine blades is four, and a distance between the hinge shaft of the wind turbine blade and the center of the wind turbine shaft is $$\frac{L}{2},$$

wherein L is a length of the wind turbine blade, and a rotation angle of the upper blade part is 90°.

A lower end section of the upper blade part and an upper end section of the lower blade part both are closed surfaces, and the closed surfaces are made of steel plates.

A conduction wire pipe is disposed in the lower blade part, and communicates with the wind turbine blade hub and the motor transmission system. Wires are wired in the conduction wire pipe to be connected to the motor and supply power to the motor. The wires are severed at the wind turbine blade hub, and the two segments of wires are in contact with each other through a brush for conducting current.

The technical effects of the present invention are as follows. Under normal working conditions, the wind turbine blades can reduce a displacement of the blade tip of the blade in a swinging direction and enhance the buckling stability of the blade by means of the restraining and reinforcing function of the cable. Meanwhile, after the wind turbine blade is folded and deformed, the cable can tighten the adjacent upper blade part, so that the adjacent upper blade part abut tightly against the lower blade part where the reinforced winch is located, thereby improving the abutment stability of the lower blade part against the adjacent upper blade part and enhancing the performance that the wind turbine blades resist the severe typhoon. The present invention can perform active folding and deforming to form a stable triangular structure consisting of blades before a severe typhoon impacts. Furthermore, a slenderness ratio of the blades is reduced to improve the safety performance of the horizontal axis wind turbine under the condition of a severe typhoon. The present invention has a novel and reasonable structure, which can significantly reduce the possibility of instability and fracture of the wind turbine blades under the condition of a severe typhoon. The folding and deforming of the blades are recovered after the passing of the typhoon, which can prolong the service life of the wind turbine and reduce annual costs associated with the wind turbine, and the wind turbine is suitable for popularization and use.

The reference designators are as follows: Wind turbine blade 1, Upper blade part 11, Lower blade part 12, Winch 2, Hinge device 3, Lower hinge 31, Upper hinge 32, Hinge base 33, Hinge shaft 34, Cable 4, Conduction wire pipe 5, Motor transmission system 6, Motor 61, Motor transmission gear 62, Brush 7.

DETAILED DESCRIPTION OF EMBODIMENTS

The embodiments of the present invention are further described in detail in conjunction with the drawings below.

Figure 1:
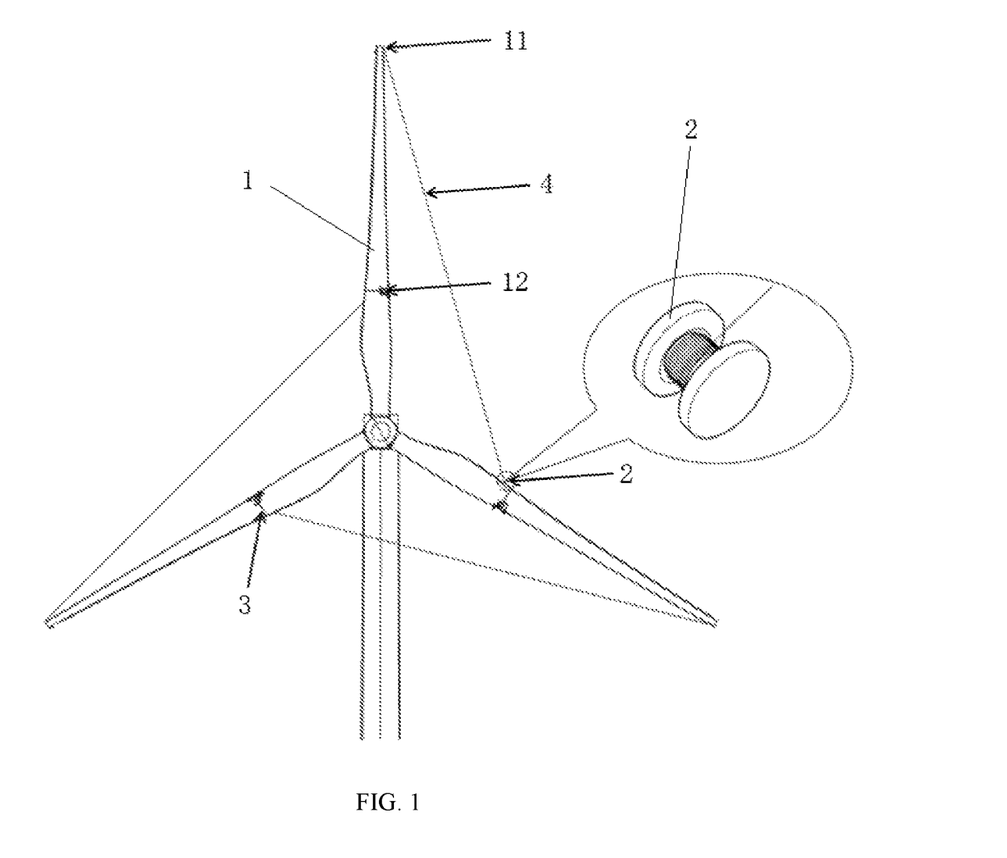
FIG. 1 is a structural schematic diagram of a wind turbine under normal working conditions of the present invention.

First Embodiment: an active folding wind turbine capable of resisting severe typhoons of the present embodiment. An upper end of the active folding wind turbine is provided with a wind turbine blade hub. A wind turbine shaft is installed in the wind turbine blade hub. A plurality of identical wind turbine blades 1 arranged at equal radians are installed on one end of the wind turbine shaft extending out of the wind turbine blade hub. Each wind turbine blade 1 includes an upper blade part 11 and a lower blade part 12 which are hinged by a hinge device 3. A lower portion of the lower blade part 12 is fixedly connected to the wind turbine shaft.

Figure 2:
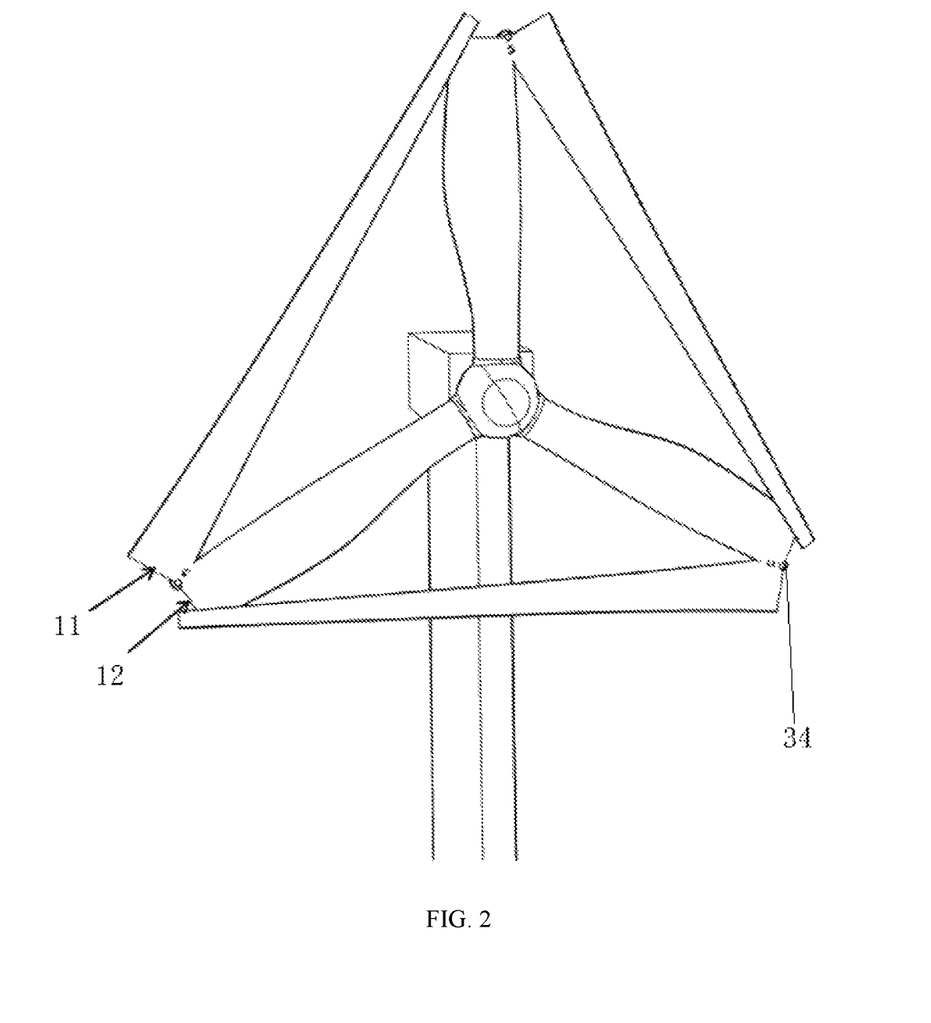
FIG. 2 is a structural schematic diagram of the folded wind turbine of the present invention.

A motor transmission system 6 is installed in the lower blade part 12. The motor transmission system 6 is connected to the hinge device 3 in a transmission manner, and can drive the upper blade part 11 to rotate relative to the lower blade part 12 through the hinge device 3, so that the wind turbine blade 1 is bent. When the upper blade part 11 rotates to an end of a travel, a blade tip of the upper blade part 11 is propped against an upper end of the lower blade part 12 of one adjacent wind turbine blade 1. A winch 2 is built in an upper portion of the lower blade part 12 of the wind turbine blade 1, and the winch 2 is provided with a cable 4. One end of the cable 4 is wound on the winch 2, and the other end thereof is fixedly connected to the upper blade part 11 of the adjacent wind turbine blade 1 propped against the lower blade part 12. When the winch 2 tightens the cable 4, the abutment stability is strengthened between the lower blade part 12 where the winch 2 is located and the adjacent upper blade part 11.

Figure 3:
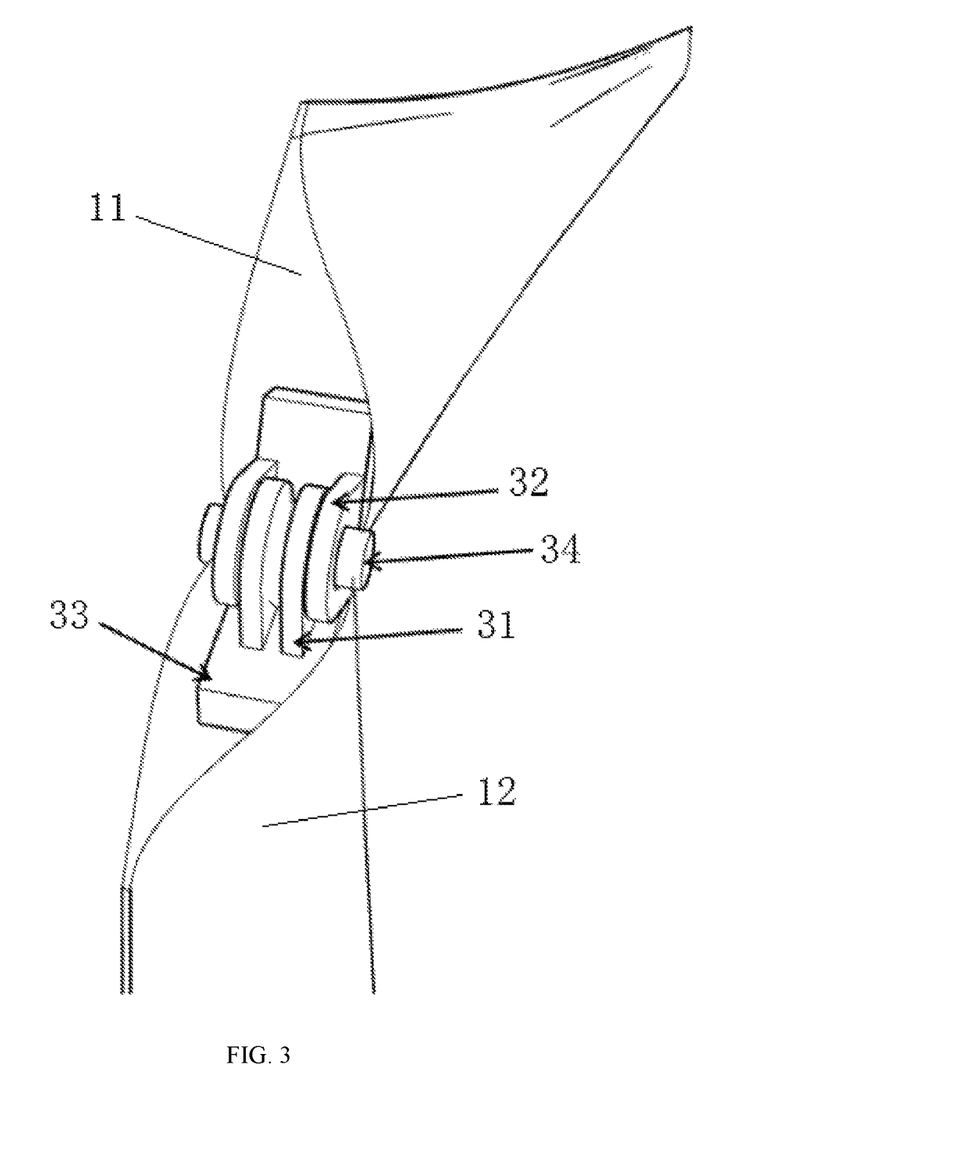
FIG. 3 is a schematic diagram of a hinge of a wind turbine blade of the present invention.

The hinge device 3 includes a lower hinge 31, an upper hinge 32, a hinge base 33, and a hinge shaft 34, the hinge base 33 is fixedly connected to the upper end of the lower blade part 12. The lower hinge 31 is fixed on the hinge base 33. The upper hinge 32 is fixed on the lower end of the upper blade part 11. The lower hinge 31 and the upper hinge 32 are hinged and fit with each other through the hinge shaft 34.

Figure 4:
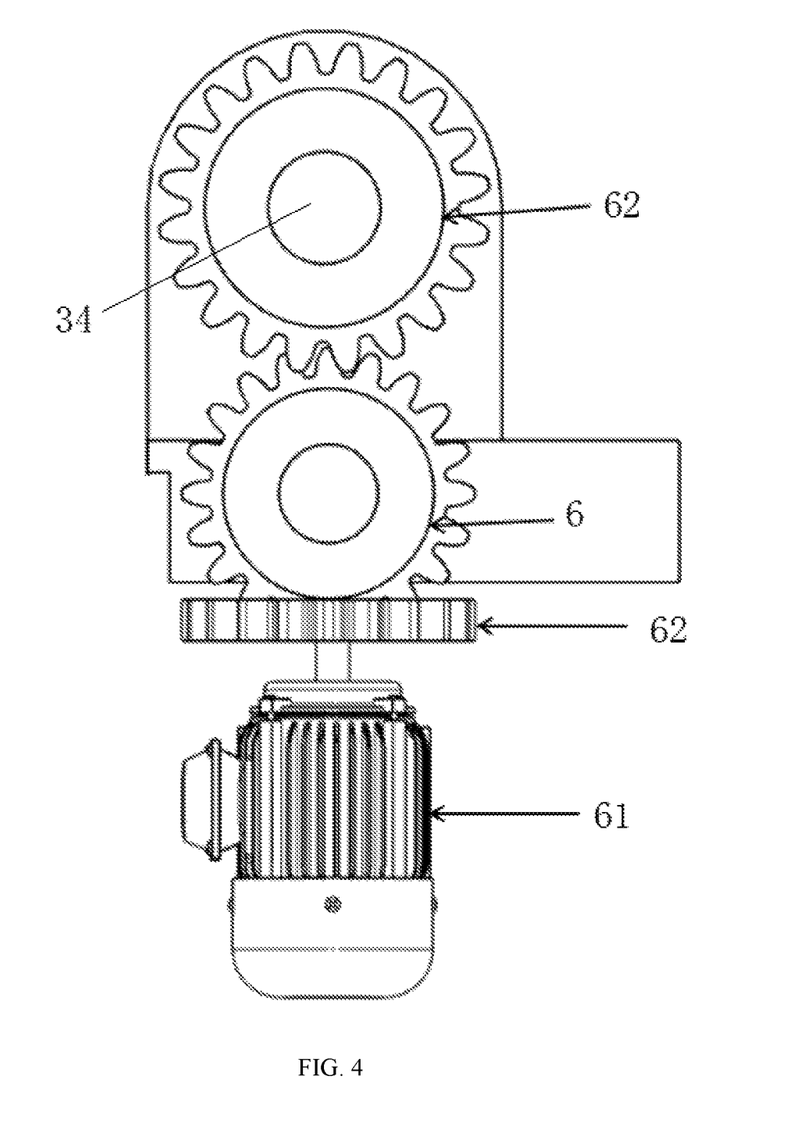
FIG. 4 is a schematic diagram showing the gear transmission of a servo motor of the present invention.

The motor transmission system 6 includes a motor 61 and a motor transmission gear 62. A motor shaft of the motor 61 is connected to the motor transmission gear 62 in a transmission manner. The motor transmission gear 62 is engaged and fits with the hinge shaft 34. When the motor 61 runs, the motor shaft of the motor 61 drives the motor transmission gear 62 to rotate, and the motor transmission gears 62 drives the hinge shaft 34 to rotate.

The motor 61 is a servo motor that has a holding-brake and self-locking function and can rotate bidirectionally.

The number of the wind turbine blades 1 is three, and a distance between the hinge shaft 34 of the wind turbine blade 1 and a center of the wind turbine shaft is $$\frac{L}{1+\sqrt{3}},$$

wherein L is a length of the wind turbine blade 1, and a rotation angle of the upper blade part 11 is 120°.

A lower end section of the upper blade part 11 and an upper end section of the lower blade part 12 both are closed surfaces, and the closed surfaces are made of steel plates.

Figure 5:
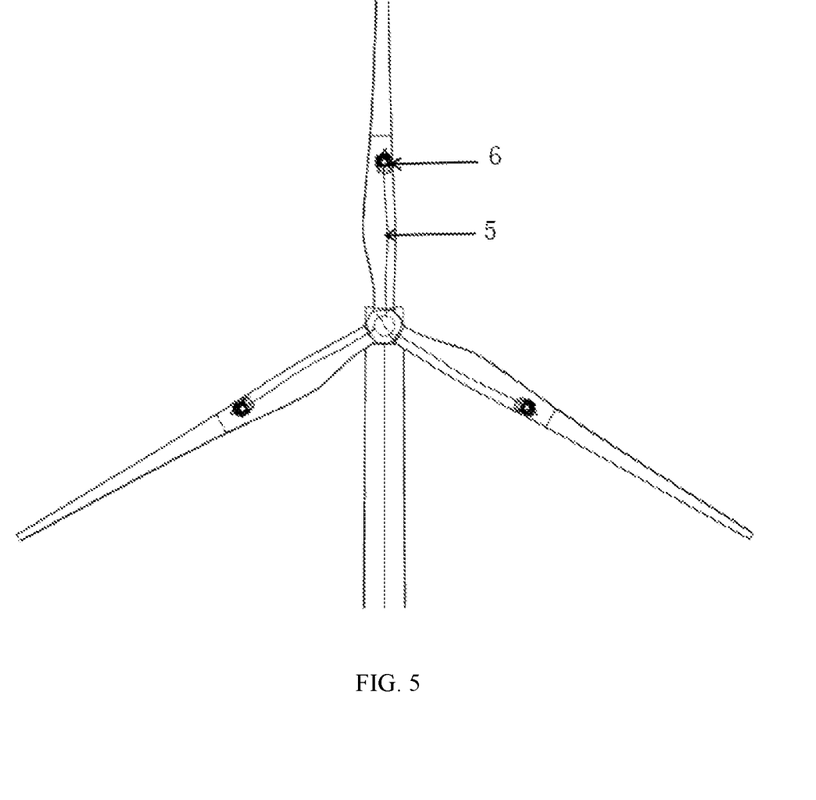
FIG. 5 is a schematic diagram of the powered-on servo motor.
Figure 6:
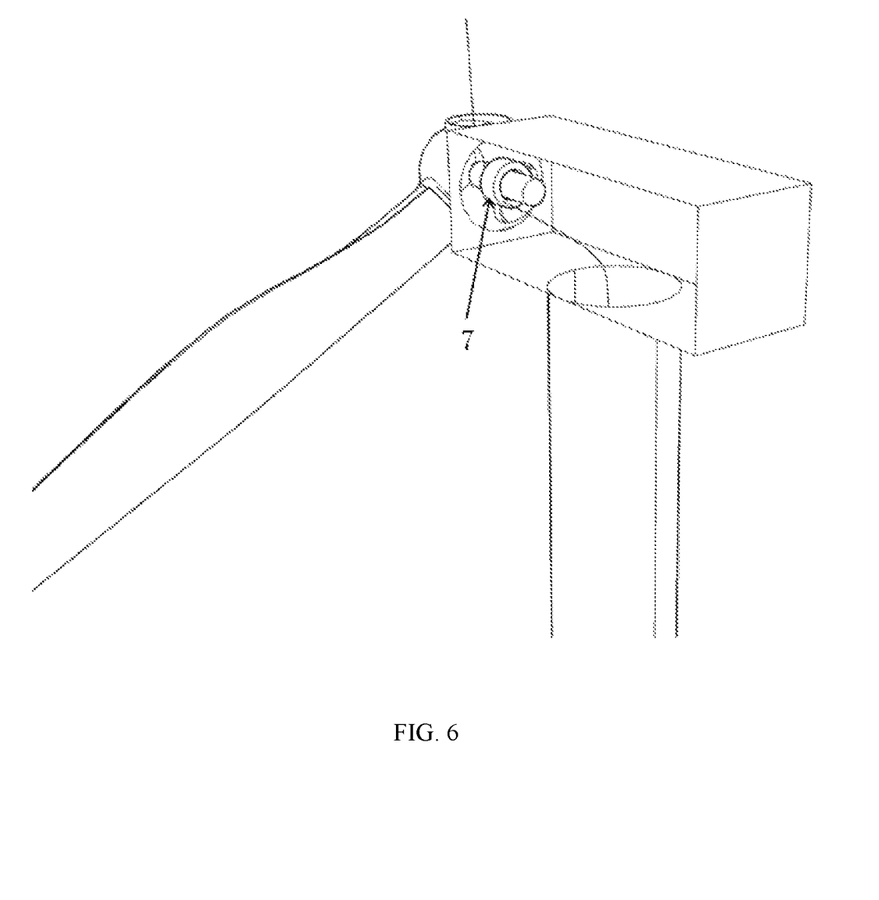
FIG. 6 is a schematic diagram of an additional brush of a wind turbine shaft.

A conduction wire pipe 5 is disposed in the lower blade part 12, and communicates with the wind turbine blade hub and the motor transmission system 6. Wires are wired in the conduction wire pipe 5. The wires are connected to the motor 61 and supply power to the motor 61. The wires are severed at the wind turbine blade hub, and the two segments of wires are in contact with each other through a brush 7 for conducting current.

Second Embodiment

The number of the wind turbine blades 1 is four, and a distance between the hinge shaft 34 of the wind turbine blade 1 and a center of the wind turbine shaft is $$\frac{L}{2},$$

wherein L is a length of the wind turbine blade 1, and a rotation angle of the upper blade part 11 is 90°.

The portions that are not stated are the same as those of the first embodiment.

The first and second embodiments are three-blade and four-blade wind turbine structures, respectively, but the present invention can include a wind turbine structure with more blades. The multi-blade wind turbines determine a position of the hinge shaft 34 according to geometric calculations, and determine the rotation angle according to geometric calculations.

The motor 61 of the present invention is additionally provided with a holding-brake and self-locking device and can rotate bidirectionally. The type of the servo motor depends on the blade quality and installation space.

Installation angles of the blades of the present invention are determined according to the generation power and the change situation of the generation amount of the wind turbine and the load safety evaluation.

The sections of the blades of the present invention at the folded positions are sealed by using the steel plates, which can prevent rainwater from entering the blades and enhance the durability.

Two segments of wires of the present invention are in contact with each other through the brush 7 for conducting current, which can prevent the wires from knotting at the hub when the blades rotate.

The steel plates of the upper and lower bases of the hinge of the present invention are welded to steel beams of the blades.

The folding process of the blade group is completed before a typhoon arrives, and relevant technical persons should be mindful of the weather forecast and real-time information of wind speed.

In the present invention, electromagnets are installed at the lower end of the upper blade part 11 and the upper end of the lower blade part 12, respectively. The two electromagnets are connected to the wire for power. A remote control switch for controlling the power on and off is installed on the wire. Under normal working conditions, the electromagnets are powered on, the strong magnetic attraction force provided by the electromagnets firmly attracts the upper and lower blades to make the wind turbine blades run smoothly. When the blades need to be folded, the electromagnets are powered off, so that the upper and lower blades may be folded, as described.

The method of folding the wind turbine blade 1 of the active folding wind turbine of the present invention is as follows: in the normal state, as shown in FIG. 1, the folding direction of the blades is clockwise. According to the clockwise direction, three blades are a first blade, a second blade, and a third blade. When a severe typhoon is approaching, relevant technical persons control the active folding wind turbine to be folded. The electromagnets are powered off. The motor 61 drives the motor transmission gear 62 to rotate, the motor transmission gear 62 drives the hinge shaft 34 to rotate, and the hinge shaft 34 drives the upper hinge 32 to rotate, so that the upper blade part 11 rotates in the clockwise direction. The upper end of the upper blade part 11 of the first blade rotates to the upper end of the lower blade part 12 of the second blade, the upper end of the upper blade part blade 11 of the second blade rotates to the upper end of the lower blade part 12 of the third blade, and the upper end of the upper blade part 11 of the third blade rotates to the upper end of the lower blade part 12 of the first blade. Meanwhile, the winch 2 also runs, tightens the cable 4, and assists the upper blade part 11 to be propped against the adjacent lower blade part 12. At this time, the folded state of the wind turbine blades is shown in FIG. 2. Two adjacent lower blade parts 12 and the upper blade part 11 bent between the two lower blade parts 12 form a stable triangular structure. A slenderness ratio of the blades is reduced, which improves the safety performance of the horizontal axis wind turbine under the condition of a severe typhoon. After the typhoon passes, the winch 2 runs reversely, and loosens the cable 4. Meanwhile, the motor 61 rotates reversely to make the upper blade part 11 return to the position shown in FIG. 1. At this time, the motor 61 is braked and self-locked, and the electromagnets are powered on to attract tightly each other. The winch 2 runs forward again and tightens the cable 4 to increase the restraining and reinforcing function of the cable 4 and the wind turbine blade, which can reduce a displacement of the blade tip of the blade in a swinging direction and enhance the buckling stability of the blade.

The above are only the preferred embodiments of the present invention, the protection scope of the present invention is not limited to the above embodiments, and the technical solutions under the idea of the present invention all belong to the protection scope of the present invention.

It should be pointed out that, to those ordinary skilled persons in the technical field, several improvements and polishes without departing from the principle of the present invention should be regarded as the protection scope of the present invention.

What is claimed is:

1. An active folding wind turbine capable of resisting severe typhoons comprising:
   an upper end of the active folding wind turbine is provided with a wind turbine blade hub; a wind turbine shaft extending from the wind turbine blade hub; a plurality of wind turbine blades arranged at equal radians are identical and provided at one end, extending out of the wind turbine blade hub, of the wind turbine shaft;
   each wind turbine blade of the plurality of wind turbine blades comprises an upper blade part and a lower blade part, wherein the upper blade part and the lower blade part are hinged by a hinge device having a lower and an upper hinge member pivotally interconnected by a hinge shaft; a lower portion of the lower blade part is fixedly connected to the wind turbine shaft;
   a motor transmission system is provided within the lower blade part, the motor transmission system is connected to the hinge device in a transmission manner, and the motor transmission system is configured to drive the upper blade part to rotate relative to the lower blade part through the hinge device, and wherein the wind turbine blade is reconfigured into a folded orientation upon activation of the motor transmission system;
   wherein the upper blade part rotates to an end of travel, a blade tip of the upper blade part is propped against an upper end of the lower blade part of an adjacent wind turbine blade;
   a winch is provided on an upper portion of the lower blade part of the wind turbine blade, and the winch is provided with a cable; a first end of the cable is wound on the winch, and a second end of the cable is fixedly connected to the upper blade part of the adjacent wind turbine blade propped against the lower blade part; and
   wherein the winch tightens the cable, an abutment stability is enhanced between the lower blade part where the winch is located and the upper blade part of the adjacent wind turbine blade.

2. The active folding wind turbine of claim 1, wherein for each of the wind turbine blades,
a hinge base is fixedly connected to the upper end of the lower blade part, the lower hinge member is fixed on the hinge base, the upper hinge member is fixed on a lower end of the upper blade part, and the lower hinge member and the upper hinge member are hingedly secured together and fit within each other through the hinge shaft.

3. The active folding wind turbine of claim 2, wherein for each of the wind turbine blades,
the motor transmission system comprises a motor and a motor transmission gear, wherein a motor shaft of the motor is connected to the motor transmission gear in a transmission manner, the motor transmission gear is engaged and fitted with the hinge shaft, wherein the motor runs, the motor shaft of the motor drives the motor transmission gear to rotate, and the motor transmission gear drives the hinge shaft to rotate.

4. The active folding wind turbine of claim 3, wherein for each of the wind turbine blades,
the motor is a servo motor, and the servo motor has a holding-brake and is self-locking, said servo motor is configured to rotate bidirectionally.

5. The active folding wind turbine of claim 4, wherein a number of the wind turbine blades is three, and for each of the wind turbine blades, a distance between the hinge shaft of the wind turbine blade and a center of the wind turbine shaft is $$\frac{L}{1+\sqrt{3}},$$

wherein L is a length of the wind turbine blade, and a rotation angle of the upper blade part is 120°.

6. The active folding wind turbine of claim 5, wherein for each of the wind turbine blades,
a lower end section of the upper blade part and an upper end section of the lower blade part are closed surfaces, and the closed surfaces are made of steel plates.

7. The active folding wind turbine of claim 6, wherein for each of the wind turbine blades,
a conduction wire pipe is disposed in the lower blade part;
the conduction wire pipe communicates with the wind turbine blade hub and the motor transmission system;
wires are wired in the conduction wire pipe;
the wires are connected to the motor and supply power to the motor;
the wires are severed at the wind turbine blade hub; and
two segments of the wires are in contact with each other through a brush for conducting current.

8. The active folding wind turbine of claim 4, wherein
a number of the wind turbine blades is four, and for each of the wind turbine blades, a distance between the hinge shaft of the wind turbine blade and a center of the wind turbine shaft is $$\frac{L}{2},$$

wherein L is a length of the wind turbine blade, and a rotation angle of the upper blade part is 90°.

9. The active folding wind turbine of claim 8, wherein for each of the wind turbine blades,
a lower end section of the upper blade part and an upper end section of the lower blade part are closed surfaces, and the closed surfaces are made of steel plates.

10. The active folding wind turbine of claim 9, wherein for each of the wind turbine blades,
a conduction wire pipe is disposed in the lower blade part, and the conduction wire pipe communicates with the wind turbine blade hub and the motor transmission system;
wires are wired in the conduction wire pipe, and the wires are connected to the motor and supply power to the motor; and
the wires are severed at the wind turbine blade hub, and two segments of the wires are in contact with each other through a brush for conducting current.

* * * * *